UNITED STATES PATENT OFFICE.

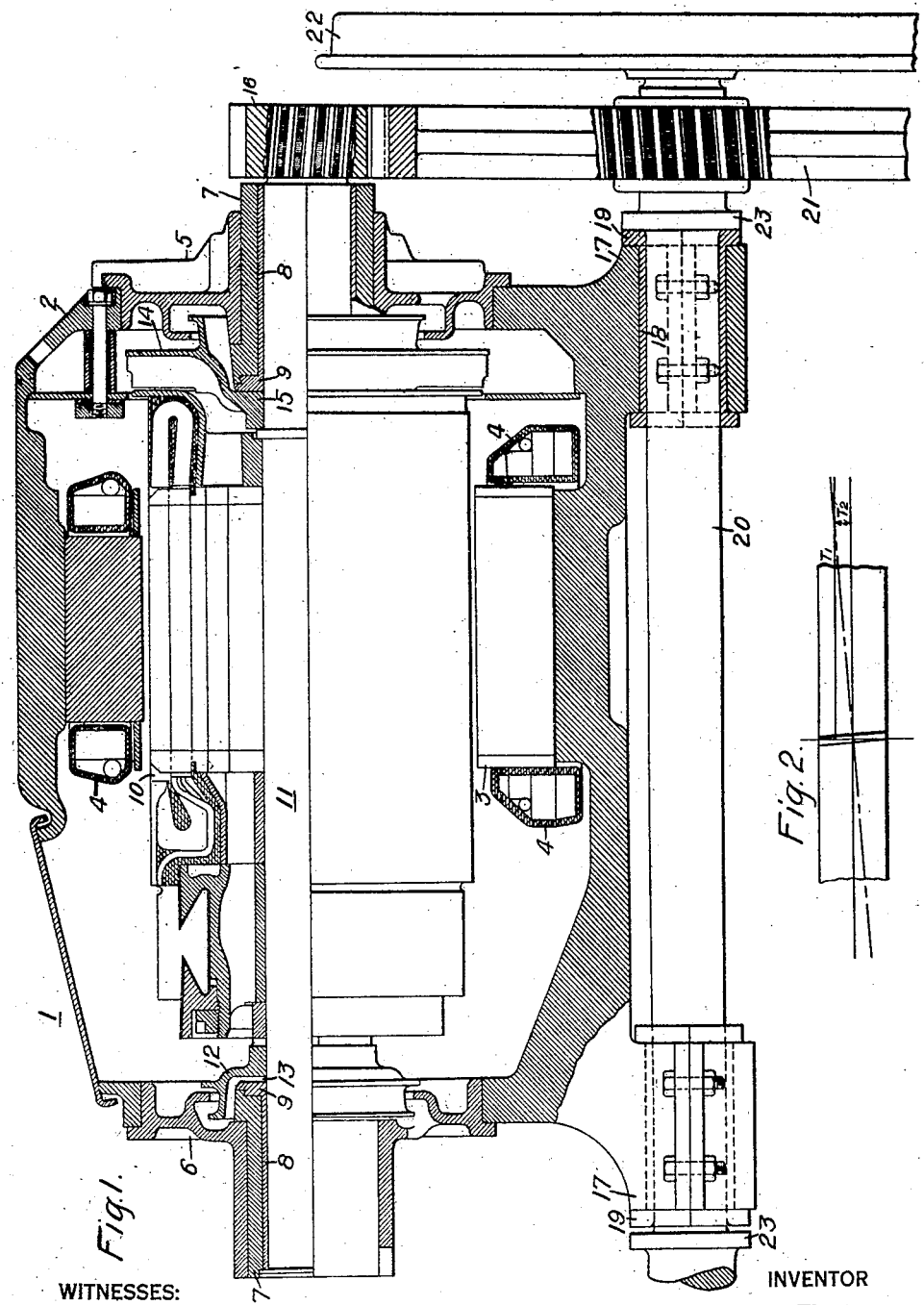

WILLIAM E. MOORE, OF MILWAUKEE, WISCONSIN, ASSIGNOR TO R. D. NUTTALL COMPANY, A CORPORATION OF PENNSYLVANIA.

GEAR FOR RAILWAY MOTORS.

1,417,937.  Specification of Letters Patent.  Patented May 30, 1922.

Application filed August 1, 1919. Serial No. 314,596.

*To all whom it may concern:*

Be it known that I, WILLIAM E. MOORE, a citizen of the United States, and a resident of Milwaukee, in the county of Milwaukee and State of Wisconsin, have invented a new and useful Improvement in Gears for Railway Motors, of which the following is a specification.

My invention relates to power-transmission mechanisms and particularly to devices for transmitting power from a driving shaft to a driven shaft parallel thereto by means of gear wheels.

One object of my invention is to provide cooperating gear wheels on parallel shafts, having teeth cut on a helix of so small a developed angle as to permit of the use of end-thrust collars of the kind usually provided for spur gear wheels.

Another object of my invention is to provide a single gear wheel having teeth cut on a helical angle much smaller than angles previously employed, which will co-operate with a complementary gear wheel mounted on a parallel shaft to transmit power with a relatively small amount of vibration and noise.

Heretofore, the gear wheels used to transmit power from one shaft to another parallel thereto have usually been spur gear wheels, the operation of which was accompanied by vibration and noise due, in general, to the following causes. In meshing spur pinions and gear wheels, there is a portion of the time that any given tooth of the pinion is in contact with the gear wheel, during which the entire load being transmitted, is carried by that one tooth alone. During the remaining portion of its action with the co-operating gear wheel, it is assisted in carrying the load by the tooth ahead or by the tooth following. A gear tooth may be considered as a beam fixed at its root and loaded as a cantilever by the pressure transmitted. This load produces tooth deflection, this deflection varying as a function of the pressure transmitted.

When a tooth in the pinion first makes contact with a tooth in the co-operating gear wheel, the distance between this pinion tooth and the tooth leading it in the mesh, is less than the normal pitch by an amount equal to the deflection of the leading tooth. At the same time, the distance between the contacting gear tooth and the gear tooth leading it into mesh is greater than the normal pitch by an amount equal to the deflection of the leading gear tooth, that is, the deflections noted are added together to produce relative displacement of the contacting gear and pinion teeth thus bringing them into contact sooner than should occur. That is, the relative position of co-operating gear wheel teeth just before contact is different from their relative position immediately after contact or as soon as they have assumed their load. In spur gear wheels, this change of relative tooth location occurs simultaneously over the entire width of gear tooth face and results in pressure between the co-operating teeth which vary widely from the average tooth pressure. Therefore, the operation of co-operating spur pinions and gear wheels under load is unavoidably accompanied by shock and resultant vibration and noise.

There may also be slight inaccuracies in the shape of the teeth, even with the best tooth-cutting methods, and the necessary clearances in the bearings permit varying gear-center distances, features which co-operate with the action described above to produce shock coincident with tooth contact, with resultant vibration, particularly at high speeds.

As the contact pressure between two co-operating spur gear teeth varies during the time they are in contact, a greater pressure will be exerted at one point of the tooth than at another, producing localized wear on the tooth, resulting in a departure from the original contour of the tooth. As the wear on the tooth continues and its contour is changed still more, the resulting shock and vibration becomes cumulative; at the same time, the bearing wear accumulates, permitting greater vibration and also increasing the severity of the tooth shock, thus establishing a complete cycle of progressive deterioration. In the case of railway-motor equipments, the above-mentioned shock and vibration may cause any or all of the following troubles: open circuits in the armature winding, breakdowns in the insulation on the windings of the motor, loose armature punchings, loose axle caps and bearings, vibration of brush holders, tendency to spark and to wear the commutator, etc.

In certain kinds of work where the service conditions are especially severe, as, for example, in heavy electric railway locomotives, the detrimental results of the vibration and shock are partially overcome by the use of flexible connections or of flexible gears but this method is merely a palliative and not a remedy. Helical gear wheels are the remedy but, heretofore, it has been necessary to use, in effect, two gear wheels on each of two parallel shafts with the angle of the teeth on the one wheel cut to the other hand from that on the other wheel so that there may be no unbalanced end thrust. The angle of the developed tooth helix of such gear wheels may, therefore, be made of any desired amount and this angle may be 23½° or even greater.

The action of single helical gear wheels may be briefly pointed out here. A helical gear wheel may be considered as being composed of a large number of thin spur-gear-wheel elements, with the teeth of each successive gear element advanced through a small angle relative to its neighbor. It is clear that, when such helical gear wheel is in operation, only one tooth of one very narrow gear element enters into contact with the corresponding tooth of the single very narrow co-operating pinion or gear wheel at any given time. The shock resulting from this contact bears, to the whole operation, an importance depending directly upon the thickness of the narrow pinion and the gear-wheel element; but, in helical gearing, the width of this element is zero, therefore, the shock is zero and, consequently, the operation of helical gear wheels is very smooth.

The distribution of load over the teeth of helical gear wheels is much better than in spur gear wheels, but there is still a certain amount of tooth deflection which we may consider briefly. As the teeth are not parallel to the axis of the gear wheel, one end of the helical tooth of one gear wheel contacts with the cooperating tooth of the other gear wheel or pinion in advance of the rest of the tooth. As this end picks up its load it will deflect but, as only a very small portion of the width of each tooth picks up its load and deflection at any given time, the resulting shock and vibration are very small and cannot be detected by ordinary methods.

The departure of tooth pressure from the average is therefore very small in helical gear wheels, and there are, therefore, no peaks of pressure to cause local wear and local departure from the original contour of the tooth, resulting in even wear over the entire radial length of the tooth thus preserving the original tooth form.

In practicing my invention, I provide a single pinion or gear wheel on each of two parallel shafts, each having co-operating helical gear teeth with a developed helical angle much smaller than previously employed, and wearing surfaces on the two shafts co-operating with stationary wearing surfaces to retain the two shafts in their proper relative longitudinal positions, these wearing surfaces being practically identical with those heretofore employed with spur gear wheels. The angle of the teeth is made as large as is consistent with keeping the longitudinal end thrust down to a value which will be successfully withstood by the oil film on the ordinary end-thrust collars provided for that purpose.

In the single sheet of drawings, Figure 1 is a longitudinal sectional view through a back-geared railway motor, certain parts being shown in plan, on which the helical pinion and gear wheel having teeth embodying my invention are mounted, and Fig. 2 is a diagram showing the end thrust on the wearing surfaces when the motor is operating at full load.

A motor 1 comprises a suitable stationary frame 2 having a plurality of field magnets 3 and field coils 4, and end members 5 and 6. These end members 5 and 6 may be of any suitable shape and may be bolted or otherwise suitably secured to the frame and are arranged to support a bearing shell 7 which has a lining 8 of some suitable bearing metal.

At the inner end of the bearing shells 7, the lining 8 is extended radially to form a wearing surface 9. An armature 10 is mounted on a shaft 11 which is revolubly mounted in the bearing parts 7 and 8 at each end of the motor frame. At the commutator end of the shaft, an oil throwing device 12 is suitably mounted on the shaft and is arranged to comprise a wearing surface 13 which co-operates with the stationary wearing surface 9 of the commutator end bearing. A radial fan member 14 is mounted on the shaft near the pinion end of the shaft and comprises a wearing surface 15 which co-operates with the wearing surface 9 of the pinion end bearing, a small amount of end play being allowed. A pinion 16 is mounted on the shaft 11 and suitably secured thereto. The pinion 16 is provided with helical gear teeth, the angle of the developed tooth helix of which is not over 15° and may be considerably less.

The frame 2 is provided with a plurality of axle bearings 17, here shown as split bearings although any suitable construction may be used. The bearing linings 18 are extended radially outward at the outer ends of both bearings to provide a wearing surface 19. An axle 20 is revolubly mounted in the bearings 17 and has mounted thereon, near one end, a helical gear wheel 21 which co-operates with the pinion 16 to transmit the power of the motor 1. The pinion 16 and the gear wheel 21 are enclosed in the usual gear case (not shown). A plurality of car wheels 22 (only one of which is shown) are mounted on the axle 20 in the usual manner. A plurality of wearing surfaces 23 are provided on the axle 20 and co-operate with the wearing surfaces 19 to take the end thrust of the axle 20.

The teeth on the gear wheel 21 have the same helical angle as do the teeth on the pinion 16 and are complementary thereto. By properly co-ordinating the various factors entering into the design, such as the width of the face of the gear wheel and the diametral pitch used, I am able to make the tooth angle much smaller than that usually employed and still obtain the good results attendant upon the use of helical gear wheels having a large tooth angle. The small tooth angle results in a relatively small end thrust which is shown in Fig. 2, where $T_1$ is the torque being transmitted by the gear wheel and $T_2$ is the end thrust. This end thrust is taken care of by the co-operating wearing surfaces and it will be noticed that the wearing surfaces at alternate ends of the shaft and the axle are in engagement at any one time. If the armature shaft be assumed to rotate in a clockwise direction, when viewed from the pinion end, the shaft will move longitudinally toward the pinion end bearing and the wearing surface 15 will engage the wearing surface 9 of the pinion end bearing. The axle 20 will move longitudinally in the opposite direction so that the wearing surface 23 at the gear wheel end will engage the wearing surface 19 of the pinion end axle bearing. If the direction of rotation is reversed, the two shafts will move longitudinally in the opposite direction to that described above and the other wearing surfaces will be engaged.

A brief discussion of the operation of spur gear wheels and of helical gear wheels, having teeth constructed according to my invention in street railway motor work, will serve to bring out the essential differences in the operation of the two types of gear wheels.

In a street railway motor having spur pinion and gear wheels, the armature is subject to only frictional restraint in a longitudinal direction. Therefore, when track irregularities cause a sudden movement of the wheeled axle across the rails, there results a sudden displacement of the motor frame and of the armature. Depending upon the direction of this longitudinal movement, either the end-thrust collars 9 and 15 or 9 and 13 will engage with a shock, and the oil film thereon will be reduced in thickness and, under especially severe shock, may even be broken. The rotating end-thrust collar 15 or 13 will scrub on the reduced oil film between it and the stationary collar 9, resulting in a certain amount of wear, this wear tending to increase more rapidly as the end play of the armature increases. In many cases, this end play has increased to such value that the brush holders have engaged the commutator necks with resulting damage to the equipment.

When helical gear wheels and pinions having teeth constructed according to my invention are used in street-railway motors, there is a slight restraining force $T_2$ tending to hold the armature against one of the end-thrust collars in a given direction of operation and against the other end-thrust collar in the reverse direction of operation. This unbalanced force $T_2$ would, of course, tend to cause wear of the end-thrust collars if it were not, as heretofore stated, kept well within the limits of capacity of the oil film on the end-thrust collars.

If an irregularity in the track tends to cause the longitudinal movement of the armature toward the pinion end of the motor frame and the armature has already moved in that direction as far as possible, because of the end thrust $T_2$, there will be no hammer blow between the two co-operating thrust collars 9 and 15. The pressure between the two co-operating surfaces will be momentarily increased and will then fall to normal value again.

If the irregularity in the track tends to move the armature toward the commutator end, the unbalanced end thrust $T_2$ will more or less successfully restrain the armature from such longitudinal movement, depending upon the relative values of the two forces. The reduction in the hammering of the co-operating end thrust collars, which I obtain by the use of the helical gear wheels embodying my invention, compensates for any wearing tendency due to the sustained pressure on the end-thrust collars.

It may be seen that I provide a power-transmitting mechanism comprising two parallel shafts—here shown as a railway motor—with a device whereby the power will be transmitted by a single helical gear or pinion on each shaft without undue end thrust and with practically no shock or vibration due to the meshing teeth. I desire to call particular attention to the relatively small angle—less than 15°—by means of which I am able to obtain all the benefits of a single helical gear wheel of the usual tooth angle without the drawbacks attending the use of the usual tooth angle, drawbacks which have made it imperative to use double gear wheels on each shaft, which eliminate the end thrust altogether, but are expensive and, as shown by my device, unnecessary.

Although I have indicated a gear-tooth angle of approximately 4° in Fig. 2 of the drawings, it will be clearly understood from the specification that the angle actually employed may have any desired value of less than 15°.

Although reasonably satisfactory operation may be ensured throughout a considerable range, but within the limits specified, elaborate and protracted tests have demonstrated that the most satisfactory results, under all conditions of operation that are encountered in commercial service, may be secured by employing gears the tooth angle of which is approximately 7½°.

While I have shown a particular illustration of the device embodying my invention, I desire it to be understood that it is applicable to any parallel-shaft, power-transmitting mechanism, and I desire that only such limitations shall be placed thereon as are set forth in the appended claims.

I claim as my invention:

1. In a railway vehicle, the combination with a wheel axle, an electric motor having an armature shaft parallel to said axle and a frame containing axle and shaft bearings, of a single helical gear wheel on the axle and a single directly co-operating helical gear wheel on the shaft for operatively connecting the axle and the shaft.

2. In a railway vehicle, the combination with a wheel axle, an electric motor comprising an armature shaft parallel to said axle and a frame containing axle and shaft bearings, of a single helical pinion mounted on said armature shaft, and a single helical gear wheel mounted on said axle and meshing with said helical pinion, the angle of the developed tooth helix of said gear and said pinion being less than 15°.

3. In a power-transmission mechanism, the combination with a railway motor having a driving shaft, a driven axle parallel to said driving shaft, and bearings for said shaft and said axle, of a single helical gear wheel mounted on said shaft, a single co-operating helical gear wheel mounted on said axle, the angle of the teeth of said gear wheels being less than 15°, and means for receiving the end thrusts of said axle and said shaft in either direction.

4. In a power-transmission mechanism, the combination with a railway motor having a driving shaft, a driven axle parallel to said driving shaft, and bearings for said shaft and said axle, of one helical gear wheel only mounted on said shaft, one co-operating helical gear wheel only mounted on said axle, and means co-operating with the gear wheels for maintaining them in their relative longitudinal positions under all conditons of operation.

5. The combination with an electric motor having a frame comprising armature and axle bearings and an armature shaft, of an axle, a plurality of oppositely disposed end-thrust collars mounted on said shaft and on said axle, and a plurality of stationary end-thrust collars co-operating with said armature and said axle end-thrust collars, of a pinion mounted on said armature shaft, a co-operating gear wheel mounted on said axle, the teeth on both pinion and gear wheel being angularly disposed to cause the armature shaft to engage one set of end-thrust collars when rotating in one direction and to engage the other set of end-thrust collars when rotating in the opposite direction.

6. The combination with a movable frame, a shaft and an axle journalled in said frame and means for limiting longitudinal movement thereof in one direction, of a driving connection tending to prevent displacement of the shaft and the axle in the opposite longitudinal direction when in driving relation, said driving connection consisting of a single set of co-operating helical gear wheels, the angle of the developed tooth helix of each of said gear wheels being less than 15°.

7. The combination with a frame movable in a horizontal plane, two shafts journalled in the frame and means for limiting longitudinal movement of the shafts in either direction, of a driving connection for the shafts tending to maintain said shafts in opposite longitudinally-displaced relation and to prevent displacement of the shafts in the respective opposite directions when in driving relation, said driving connection consisting of co-operating helical gear wheels, one on each shaft, each gear wheel having teeth, the angle of which, with respect to the axis, is less than 15°.

8. The combination with an electric-railway motor frame, an armature shaft and a driven shaft operatively journalled in said frame, said shafts being subjected to limited longitudinal movements relatively to said frame during normal operation, by reason of extraneous conditions, of a driving connection for the shafts tending to restrain the longitudinal movement of said shafts in respective opposite directions, said driving connection consisting solely of two co-operating helical gear wheels.

9. A railway motor comprising a frame, an armature shaft rotatably mounted in said frame and having limited longitudinal movement relatively thereto, and a single means for transmitting the driving effort of said armature shaft, for causing said shaft to be normally located at one limit of its longitudinal movement and for resisting a tendency to sudden momentary changes of position of said shaft with a force which is less than the total tooth pressure times the tangent 15°.

10. A railway motor comprising a frame, an armature shaft and an axle shaft rotatably associated with said frame and having limited longitudinal movement relatively thereto, and a single means for transmitting the driving effort of said armature shaft to said axle shaft, for causing said shafts to be normally located at one limit of their longitudinal movement and for resisting a tendency to sudden momentary changes of position of said shafts relatively to said frame with a force which is less than the total tooth pressure times the tangent 15°.

11. The combination, in a railway vehicle, of a wheel axle, an armature shaft, a frame containing bearings for the shaft and the axle, end-thrust members for the shaft, a gear wheel on the axle, and a pinion secured to the shaft and co-operating with the gear wheel, the pinion and the gear wheel being provided with co-operating helical teeth of such pitch that the driving pressure of the pinion exerts an endwise thrust on the shaft less than the force required to break the film of lubricant between the end-thrust member and the bearing at one end of the shaft and sufficient to prevent breaking of the film of lubricant at the other end of the shaft under abnormal endwise thrust in the opposite direction.

12. The combination with a driving shaft and a driven shaft, one of which is subject to shocks longitudinally thereof, of bearings and end-thrust members therefor, and co-operating gear wheels mounted on the respective shafts, the said gear wheels being provided with helical teeth of such pitch that the driving pressure exerts an end thrust on the shafts less than the force required to break the film of lubricant between the end-thrust members and the bearing at one end of each of the shafts but sufficient to prevent breakage of the film of lubricant at the other end of each shaft under abnormal endwise thrust in the opposite direction.

13. The combination with a driving and a driven shaft, of a lubricated end thrust bearing surface for each of the shafts, co-operating gear wheels mounted on the respective shafts, the said gear wheels being provided with helical teeth of such angularity that the driving pressure exerts an end thrust on the shafts less than the force required to break the film of lubricant upon the said bearing surfaces.

14. The combination with a shaft provided with a lubricated end thrust bearing surface, of means for driving the shaft comprising a pair of co-operating gear wheels each of which is provided with helical teeth of such angularity that the driving pressure exerts an end thrust on the shaft of less force than that required to break the film of lubricant upon the said bearing surface.

15. The combination with a shaft and a bearing therefor comprising the usual thrust collar, of means for driving said shaft comprising a motor and a single pair of helical gear wheels, all of the devices being so related and arranged that the pressure exerted by the longitudinal component of the driving force of said motor does not exceed a predetermined value per unit area of thrust bearing surface.

16. The combination with a shaft, and a thrust bearing therefor, of means for driving said shaft comprising a pair of helical gear wheels, the angle of the developed tooth helix of the said gear wheels and the effective area of said bearing being so related that the pressure exerted by the longitudinal component of the driving force transmitted by said gear wheels does not exceed a predetermined value per unit area of said bearing.

17. The combination with a shaft, and a thrust bearing therefor, of means for driving said shaft comprising a pair of helical gear wheels the developed tooth helix of which is so proportioned to the torque transmitted that the end thrust on the shaft does not exceed a predetermined pressure per unit area of thrust bearing surface.

In testimony whereof, I have hereunto subscribed my name this 29th day of July, 1919.

WILLIAM E. MOORE.